United States Patent
Sanga

[11] 3,866,551
[45] Feb. 18, 1975

[54] COMBUSTION FURNACE

[76] Inventor: Yasuhiro Sanga, 19-26, 5-chome, Tokyo, Japan

[22] Filed: Sept. 6, 1973

[21] Appl. No.: 394,913

[52] U.S. Cl. .................... 110/8 R, 110/8 A, 110/10
[51] Int. Cl. ............................................. F23g 5/00
[58] Field of Search ............. 110/8 R, 8 A, 8 C, 10; 23/288 R; 252/477 R

[56] References Cited
UNITED STATES PATENTS

| | | | |
|---|---|---|---|
| 2,658,742 | 11/1953 | Suter et al. ......................... | 110/8 X |
| 2,869,487 | 1/1959 | Sherman ............................. | 110/8 |
| 2,962,987 | 12/1960 | Hebert et al. ...................... | 110/8 X |
| 3,016,108 | 1/1962 | Myddelton ......................... | 23/288 X |
| 3,124,930 | 3/1964 | Powers ............................... | 23/288 X |
| 3,643,633 | 2/1972 | Sugano .............................. | 110/10 |

Primary Examiner—Kenneth W. Sprague
Attorney, Agent, or Firm—Whittemore, Hulbert & Belknap

[57] ABSTRACT

A combustion furnace for perfectly burning waste having a primary combustion chamber provided with a roaster, a flue chamber and a secondary combustion chamber, and a heat resisting steel grate having a conical or a pyramid shape disposed within the flue chamber.

7 Claims, 4 Drawing Figures

COMBUSTION FURNACE

BACKGROUND OF THE INVENTION

This invention relates to a combustion furnace for perfectly burning waste such as waste oil, waste tires, and waste rubber and plastic articles.

The object of the present invention is to provide a combustion furnace for effecting perfect combustion by thermal cracking of the waste to be incinerated at a relatively low temperature and subsequently passing the gas generated by said thermal cracking through a hot heat resistant steel grate having a conical or pyramidal shape.

Several types of combustion furnaces for plastic waste have been developed, but the waste to be incinerated therein is limited to relatively simple compositions. Furthermore, most of these known furnaces are expensive. The combustion furnace of the present invention can economically incinerate relatively small quantities of waste at lower temperatures and without any pollution of the atmosphere.

The invention will now be described by way of example with reference to the accompanying drawings.

DESCRIPTION OF A PREFERRED EMBODIMENT

Figure 1:
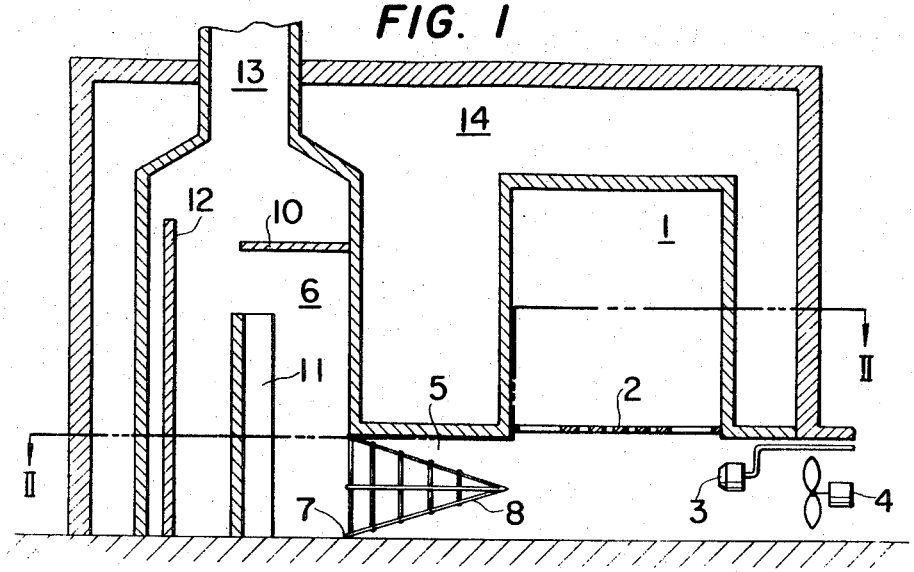
FIG. 1 is a sectional side view showing an embodiment of the combustion furnace according to the present invention.
Figure 2:
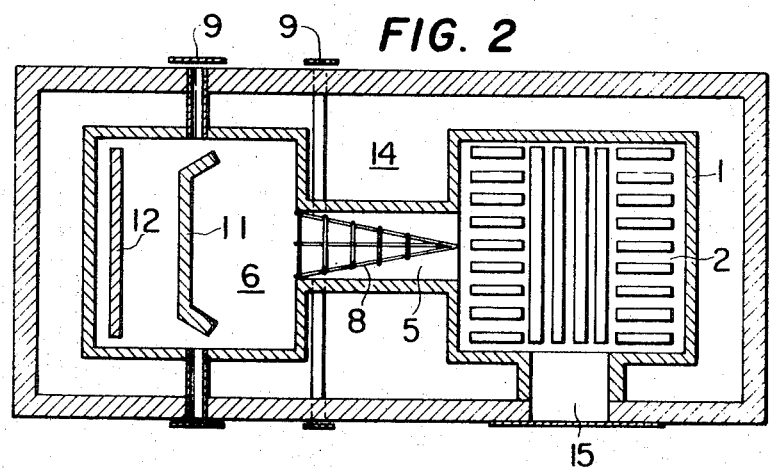
FIG. 2 is a cross-sectional view taken along the line II—II of FIG. 1, FIGS. 3(a) and 3(b) are perspective views of two embodiments of the heat resisting steel grate according to the present invention.
Figure 3A:
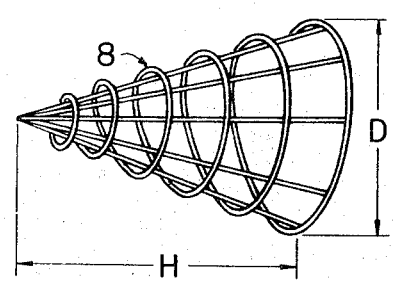
Figure 3B:
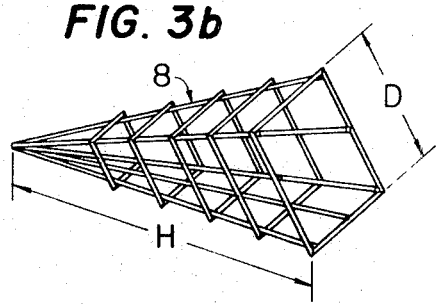

Referring to the drawings, the combustion furnace has a primary combustion chamber 1 provided at the lower portion thereof with a roaster 2. Adjacent the lower side wall of said chamber 1 are provided an auxiliary heavy oil burner 3 and a fan 4. The primary combustion chamber 1 communicates through the space under the roaster 2 with a horizontal flue chamber 5. A heat resistant steel grate 8 having a conical or pyramidal shape with its converging or tapered end oriented towards the primary combustion chamber 1 is disposed within the flue chamber 5 adjacent side wall 7 of the furnace portion at the junction of the flue chamber 5 with the secondary combustion chamber 6. The heat resisting steel grate 8 has the conical shape shown in FIG. 3a or the pyramidal shape shown in FIG. 3b with the ratio between the diameter or the length D of one side of the base to the height H of the conical or pyramidal shape preferably being within the range of 1–3. Supply openings 9 for supplying secondary combustion air are formed in the side wall at the juncture of the flue chamber and the secondary combustion chamber and in the side walls of the secondary combustion chamber. Flame shielding plates 10, 11 and 12 are provided in the secondary combustion chamber. A discharge opening 13 is also provided in the secondary combustion chamber. The primary combustion chamber 1, the flue chamber 5 and the secondary combustion chamber 6 may be arranged within a water jacket 14 to control the temperature in the furnace.

In the operation of the above mentioned combustion furnace, the waste to be incinerated is first thrown into the primary combustion chamber 1 through an inlet opening 15 and the heat resistant steel grate 8 in the flue chamber is heated when the temperature in the furnace is raised by igniting the auxiliary burner 3. Once the waste is burnt, the combustion of the waste is continued by itself. The waste is thermally cracked into a smokeless gas by keeping the temperature in the primary combustion chamber within 400°–500°C. The resulting gas is fed into the secondary combustion chamber 6 through the hot steel grate 8 by the fan 4. In the secondary combustion chamber the gas is completely burnt due to the introduction of secondary combustion air from the supply openings 9 in the side wall of the furnace. The secondary combustion chamber is uniformly heated by a flame since the flame shielding plates 10 and 11 are so formed and arranged within the chamber that the unburned gas is perfectly burnt in the secondary combustion chamber. Local decreases in temperature in the secondary combustion chamber are prevented by the flame shielding plate 12 which prevents the flame from directly contacting the wall of the furnace. The gas which was perfectly burned in the secondary combustion chamber is discharged through opening 13.

In the combustion furnace of the present invention the gas generated by thermal cracking at a relatively low temperature is perfectly burnt by passing through the hot grate 8 made of heat and corrosion resistant steel containing more than 18 percent chromium and having a conical or pyramid shape, and preferably having a relationship of D<H with the diameter D being more than 10 mm. The discharged gas is smokeless and odorless. Thus, for example, when the combustion furnace of the present invention is used the quantity of $SO_2$ and dust included in the discharged gas is shown in the following table:

Table I

| Waste material<br>Inclusion | Waste oil | Waste tire | Kerosene<br>+ Plastics |
|---|---|---|---|
| $SO_2$ Nm³/h | 0.1809 | 0.091 | — |
| dust g/Nm³ | 0.138 | 0.0475 | 0.0348 |

When a high molecular compound containing chlorine such as polyvinyl chloride and neoprene rubber is incinerated the discharged gas includes large amounts of chlorine gas. It is, therefore, desirable to include a device for cleansing the discharged gas with water to remove the chlorine from said gas.

What is claimed is:

1. A combustion furnace comprising a primary combustion chamber having a roaster, a flue chamber, a secondary combustion chamber, said chambers being in communication with each other, and a conically or pyramidally shaped heat resisting steel grate disposed in said flue chamber with its tapered end oriented towards said primary combustion chamber from said secondary combustion chamber.

2. A furnace for burning waste material comprising a primary combustion chamber provided at its lower portion with a roaster, an inlet opening for introducing waste material into said roaster, a horizontal flue beneath said roaster for the gaseous products evolved from the roasted waste material by thermal cracking at a relatively low temperature, a secondary combustion chamber at the opposite end of said horizontal flue extending upwardly therefrom to a discharge opening, a heat resisting metallic grate in said flue between said roaster and said secondary combustion chamber adapted to be heated to a temperature to oxidize said gaseous products from said roaster before entering said secondary combustion chamber and means for introducing additional air into said secondary combustion chamber to complete the combustion therein of said oxidized gaseous products emerging from said heated metallic grate.

3. A furnace according to claim 2 further having a burner in said flue beneath said roaster and having a fan for blowing the flame from said burner through said metallic grate thereby heating said grate to said oxidizing temperature.

4. A furnace according to claim 3 wherein said heat resisting metallic grate is of a flaring form with the large end at the secondary combustion chamber and its sides converging towards said primary combustion chamber, whereby the gaseous products from said roaster propelled by said fan pass completely through the flaring walls of said grate.

5. A furnace according to claim 4 in which the flaring metallic grate is composed of a heat resisting and corrosion resisting steel containing more than 18 percent chromium and the diameter of the large end is less than the distance between the large end and the apex.

6. A furnace according to claim 5 in which the grate has a conical shape.

7. A furnace according to claim 2 having a water jacket surrounding said primary combustion chamber, said flue chamber and said secondary combustion chamber.

* * * * *